(12) United States Patent
Radi et al.

(10) Patent No.: US 11,294,811 B2
(45) Date of Patent: Apr. 5, 2022

(54) FAULT TOLERANT DATA COHERENCE IN LARGE-SCALE DISTRIBUTED CACHE SYSTEMS

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 63 days.

(21) Appl. No.: 16/697,019

(22) Filed: Nov. 26, 2019

(65) Prior Publication Data

US 2020/0351370 A1 Nov. 5, 2020

Related U.S. Application Data

(60) Provisional application No. 62/842,959, filed on May 3, 2019.

(51) Int. Cl.
*G06F 12/0862* (2016.01)
*G06F 12/0806* (2016.01)
*G06F 12/0802* (2016.01)
*H04L 67/1097* (2022.01)
*H04L 67/568* (2022.01)
(Continued)

(52) U.S. Cl.
CPC ........ *G06F 12/0862* (2013.01); *G06F 12/082* (2013.01); *G06F 12/0802* (2013.01); *G06F 12/0806* (2013.01); *G06F 12/0817* (2013.01); *G06F 12/0822* (2013.01); *G06F 12/0828* (2013.01); *H04L 67/1097* (2013.01); *H04L 67/2842* (2013.01); *G06F 9/34* (2013.01);
(Continued)

(58) Field of Classification Search
CPC ............. G06F 12/0828; G06F 12/0811; G06F 12/0815; G06F 12/0893; G06F 13/1663; G06F 13/4022; G06F 15/17
See application file for complete search history.

(56) References Cited

U.S. PATENT DOCUMENTS 6,078,997 A 6/2000 Young et al.
6,108,737 A * 8/2000 Sharma ............... G06F 9/30047
709/213
(Continued)

OTHER PUBLICATIONS

Hashemi et al.; "Learning Memory Access Patters"; 15 pages; Mar. 6, 2018; available at https://arxiv.org/pdf/1803.02329.pdf.
(Continued)

*Primary Examiner* — Barbara B Anyan
(74) *Attorney, Agent, or Firm* — Barry IP Law, P.C.

(57) ABSTRACT

A programmable switch includes a plurality of ports for communication with devices on a network. Circuitry of the programmable switch is configured to receive a cache line request from a client on the network to obtain a cache line for performing an operation by the client. A port is identified for communicating with a memory device storing the cache line. The memory device is one of a plurality of memory devices used for a distributed cache. The circuitry is further configured to update a cache directory for the distributed cache based on the cache line request, and send the cache line request to the memory device using the identified port. In one aspect, it is determined whether the cache line request is for modifying the cache line.

31 Claims, 11 Drawing Sheets

(51) Int. Cl.
  *G06F 12/0817* (2016.01)
  *G06F 9/38* (2018.01)
  *G06F 9/34* (2018.01)
(52) U.S. Cl.
  CPC ...... *G06F 9/3824* (2013.01); *G06F 2212/154* (2013.01); *G06F 2212/602* (2013.01)

(56) References Cited

U.S. PATENT DOCUMENTS

| | | | |
|---|---|---|---|
| 6,209,065 B1* | 3/2001 | Van Doren | G06F 9/52 |
| | | | 711/130 |
| 6,230,243 B1 | 5/2001 | Elko et al. | |
| 6,263,404 B1 | 7/2001 | Borkenhagen et al. | |
| 6,298,418 B1* | 10/2001 | Fujiwara | G06F 12/0833 |
| | | | 711/144 |
| 6,829,683 B1* | 12/2004 | Kuskin | G06F 12/0828 |
| | | | 711/141 |
| 6,868,439 B2 | 3/2005 | Basu et al. | |
| 6,954,844 B2* | 10/2005 | Lentz | G06F 12/0813 |
| | | | 712/29 |
| 6,993,630 B1* | 1/2006 | Williams | G06F 12/0862 |
| | | | 711/137 |
| 7,032,078 B2* | 4/2006 | Cypher | G06F 12/0817 |
| | | | 709/230 |
| 7,376,799 B2* | 5/2008 | Veazey | G06F 12/0817 |
| | | | 710/317 |
| 7,673,090 B2 | 3/2010 | Kaushik et al. | |
| 7,716,425 B1 | 5/2010 | Uysal et al. | |
| 7,975,025 B1 | 7/2011 | Szabo et al. | |
| 8,166,251 B2 | 4/2012 | Luttrell | |
| 8,281,075 B2* | 10/2012 | Arimilli | G06F 12/1458 |
| | | | 711/126 |
| 9,313,604 B1 | 4/2016 | Holcombe | |
| 9,442,850 B1 | 9/2016 | Rangarajan et al. | |
| 9,819,739 B2 | 11/2017 | Hussain et al. | |
| 9,825,862 B2 | 11/2017 | Bosshart | |
| 9,826,071 B2 | 11/2017 | Bosshart | |
| 9,880,768 B2 | 1/2018 | Bosshart | |
| 9,910,615 B2 | 3/2018 | Bosshart | |
| 9,912,610 B2 | 3/2018 | Bosshart et al. | |
| 9,923,816 B2 | 3/2018 | Kim et al. | |
| 9,936,024 B2 | 4/2018 | Malwankar et al. | |
| 9,940,056 B2 | 4/2018 | Bosshart | |
| 10,038,624 B1 | 7/2018 | Cruz et al. | |
| 10,044,583 B2 | 8/2018 | Kim et al. | |
| 10,050,854 B1 | 8/2018 | Licking et al. | |
| 10,063,407 B1 | 8/2018 | Kodeboyina et al. | |
| 10,063,479 B2 | 8/2018 | Kim et al. | |
| 10,063,638 B2 | 8/2018 | Huang | |
| 10,067,967 B1 | 9/2018 | Bosshart | |
| 10,075,567 B1 | 9/2018 | Licking et al. | |
| 10,078,463 B1 | 9/2018 | Bosshart | |
| 10,084,687 B1 | 9/2018 | Sharif et al. | |
| 10,110,454 B2 | 10/2018 | Kim et al. | |
| 10,127,983 B1 | 11/2018 | Peterson et al. | |
| 10,133,499 B2 | 11/2018 | Bosshart | |
| 10,146,527 B2 | 12/2018 | Olarig et al. | |
| 10,158,573 B1 | 12/2018 | Lee et al. | |
| 10,164,829 B1 | 12/2018 | Watson et al. | |
| 10,169,108 B2* | 1/2019 | Gou | G06F 9/528 |
| 10,225,381 B1 | 3/2019 | Bosshart | |
| 10,230,810 B1 | 3/2019 | Bhide et al. | |
| 10,237,206 B1 | 3/2019 | Agrawal et al. | |
| 10,257,122 B1 | 4/2019 | Li et al. | |
| 10,268,634 B1 | 4/2019 | Bosshart et al. | |
| 10,298,456 B1 | 5/2019 | Chang | |
| 10,496,566 B2 | 12/2019 | Olarig et al. | |
| 10,628,353 B2 | 4/2020 | Prabhakar et al. | |
| 10,635,316 B2 | 4/2020 | Singh et al. | |
| 10,761,995 B2* | 9/2020 | Blaner | G06F 13/28 |
| 10,812,388 B2 | 10/2020 | Thubert et al. | |
| 2003/0009637 A1 | 1/2003 | Arimilli et al. | |
| 2003/0028819 A1 | 2/2003 | Chiu et al. | |
| 2003/0158999 A1 | 8/2003 | Hauck et al. | |
| 2004/0044850 A1 | 3/2004 | George et al. | |
| 2004/0260883 A1 | 12/2004 | Wallin et al. | |
| 2006/0265568 A1 | 11/2006 | Burton | |
| 2008/0010409 A1 | 1/2008 | Rao et al. | |
| 2009/0240664 A1 | 9/2009 | Dinker et al. | |
| 2009/0240869 A1 | 9/2009 | O'Krafka et al. | |
| 2009/0313503 A1 | 12/2009 | Atluri et al. | |
| 2010/0008260 A1 | 1/2010 | Kim et al. | |
| 2010/0223322 A1 | 9/2010 | Mott et al. | |
| 2011/0004729 A1 | 1/2011 | Akkawi et al. | |
| 2011/0093925 A1 | 4/2011 | Krishnamoorthy et al. | |
| 2011/0238923 A1 | 9/2011 | Hooker et al. | |
| 2012/0110108 A1 | 5/2012 | Li et al. | |
| 2014/0269716 A1 | 9/2014 | Pruss et al. | |
| 2014/0278575 A1 | 9/2014 | Anton et al. | |
| 2014/0362709 A1* | 12/2014 | Kashyap | H04L 43/04 |
| | | | 370/250 |
| 2015/0319243 A1 | 11/2015 | Hussain et al. | |
| 2015/0378919 A1 | 12/2015 | Anantaraman et al. | |
| 2016/0099872 A1 | 4/2016 | Kim et al. | |
| 2016/0127492 A1 | 5/2016 | Malwankar et al. | |
| 2016/0156558 A1 | 6/2016 | Hong et al. | |
| 2016/0216913 A1 | 7/2016 | Bosshart | |
| 2016/0246507 A1 | 8/2016 | Bosshart | |
| 2016/0246535 A1 | 8/2016 | Bosshart | |
| 2016/0294451 A1 | 10/2016 | Jung et al. | |
| 2016/0315964 A1* | 10/2016 | Shetty | H04L 63/105 |
| 2017/0026292 A1 | 1/2017 | Smith et al. | |
| 2017/0054618 A1 | 2/2017 | Kim | |
| 2017/0054619 A1 | 2/2017 | Kim | |
| 2017/0063690 A1 | 3/2017 | Bosshart | |
| 2017/0064047 A1 | 3/2017 | Bosshart | |
| 2017/0093707 A1 | 3/2017 | Kim et al. | |
| 2017/0093986 A1 | 3/2017 | Kim et al. | |
| 2017/0093987 A1 | 3/2017 | Kaushalram et al. | |
| 2017/0187846 A1 | 6/2017 | Shalev et al. | |
| 2017/0214599 A1 | 7/2017 | Seo et al. | |
| 2018/0173448 A1 | 6/2018 | Bosshart | |
| 2018/0176324 A1 | 6/2018 | Kumar et al. | |
| 2018/0234340 A1 | 8/2018 | Kim et al. | |
| 2018/0234355 A1 | 8/2018 | Kim et al. | |
| 2018/0239551 A1 | 8/2018 | Bosshart | |
| 2018/0242191 A1 | 8/2018 | Lundqvist et al. | |
| 2018/0262459 A1 | 9/2018 | Wang et al. | |
| 2018/0285275 A1 | 10/2018 | Barczak et al. | |
| 2018/0329818 A1 | 11/2018 | Cheng et al. | |
| 2018/0337860 A1 | 11/2018 | Kim et al. | |
| 2018/0349163 A1 | 12/2018 | Gao et al. | |
| 2018/0349285 A1 | 12/2018 | Ish et al. | |
| 2019/0012278 A1 | 1/2019 | Sindhu et al. | |
| 2019/0044878 A1 | 2/2019 | Steffen et al. | |
| 2019/0050333 A1 | 2/2019 | Chacon et al. | |
| 2019/0058646 A1 | 2/2019 | Kim et al. | |
| 2019/0196987 A1 | 6/2019 | Shen et al. | |
| 2019/0220429 A1 | 7/2019 | Ranjan et al. | |
| 2019/0227921 A1 | 7/2019 | Frolikov | |
| 2019/0370176 A1 | 12/2019 | Priyadarshi et al. | |
| 2019/0394261 A1 | 12/2019 | DeCusatis et al. | |
| 2020/0007408 A1 | 1/2020 | Siddappa | |
| 2020/0065269 A1 | 2/2020 | Balasubramani et al. | |
| 2020/0089619 A1 | 3/2020 | Hsu et al. | |
| 2020/0097212 A1 | 3/2020 | Lakshman et al. | |
| 2020/0226068 A1 | 7/2020 | Gellerich et al. | |
| 2020/0250099 A1 | 8/2020 | Campbell et al. | |
| 2020/0313999 A1 | 10/2020 | Lee et al. | |
| 2020/0349080 A1 | 11/2020 | Radi et al. | |
| 2021/0034250 A1 | 2/2021 | Mizuno et al. | |
| 2021/0034270 A1 | 2/2021 | Gupta et al. | |
| 2021/0051751 A1 | 2/2021 | Pawar | |
| 2021/0149807 A1 | 5/2021 | Gupta et al. | |
| 2021/0194828 A1 | 6/2021 | He et al. | |
| 2021/0294506 A1 | 9/2021 | Tadokoro | |

OTHER PUBLICATIONS

Kim et al.; "A Framework for Data Prefetching using Off-line Training of Markovian Predictors"; Sep. 18, 2002; 8 pages; avail-

(56) References Cited

OTHER PUBLICATIONS able at https://www.comp.nus.edu.sg/~wongwf/papers/ICCD2002.pdf.
Pending U.S. Appl. No. 16/548,116, filed Aug. 22, 2019, entitled "Distributed Cache With In-Network Prefetch", Marjan Radi et al.
Li et al.; "Pegasus: Load-Aware Selective Replication with an In-Network Coherence Directory"; Dec. 2018; 15 pages; Technical Report UW-CSE-18-12-01, University of Washington CSE, Seattle, WA.
Eisley et al.; "In-Network Cache Coherence"; 2006; pp. 321-332; Proceedings of the 39th Annual IEEE/ACM International Symposium on Microarchitecture.
Jin et al.; "NetCache: Balancing Key-Value Stores with Fast In-Network Caching"; Oct. 28, 2017; pp. 121-136; Proceedings of the 26th Symposium on Operating Systems Principles.
Liu et al.; "IncBricks: Toward In-Network Computation with an In-Network Cache"; Apr. 2017; pp. 795-809; ACM SIGOPS Operating Systems Review 51, Jul. 26, No. 2.
Vestin et al.; "FastReact: In-Network Control and Caching for Industrial Control Networks using Programmable Data Planes"; Aug. 21, 2018; pp. 219-226; IEEE 23rd International Conference on Emerging Technologies and Factory Automation (ETFA). vol. 1.
Leslie Lamport; "Paxos Made Simple"; Nov. 1, 2001; available at: https://lamport.azurewebsites.net/pubs/paxos-simple.pdf.
Paul Krzyzanowski; "Understanding Paxos"; PK.org; Distributed Systems; Nov. 1, 2018; available at: https://www.cs.rutgers.edu/~pxk/417/notes/paxos.html.
Wikipedia; Paxos (computer science); accessed on Jun. 27, 2020; available at: https://en.wikipedia.org/wiki/Paxos_(computer_science).
Pending U.S. Appl. No. 16/916,730, filed Jun. 30, 2020, entitled "Devices and Methods for Failure Detection and Recovery for a Distributed Cache", Radi et al.
Ivan Pepelnjak; Introduction to 802.1Qbb (Priority-based Flow Control-PFC); accessed on Jun. 25, 2020; available at: https://gestaltit.com/syndicated/ivan/introduction-802-1qbb-priority-based-flow-control-pfc/.
Juniper Networks Inc.; Configuring Priority-Based Flow Control for an EX Series Switch (CLI Procedure); Sep. 25, 2019; available at: https://www.juniper.net/documentation/en_US/junos/topics/task/configuration/cos-priority-flow-control-cli-ex-series.html.
Pending U.S. Appl. No. 16/914,206, filed Jun. 26, 2020, entitled "Devices and Methods for Managing Network Traffic for a Distributed Cache", Radi et al.
Cisco White Paper; "Intelligent Buffer Management on Cisco Nexus 9000 Series Switches"; Jun. 6, 2017; 22 pages; available at: https://www.cisco.com/c/en/us/products/collateral/switches/nexus-9000-series-switches/white-paper-c11-738488.html.
Pending U.S. Appl. No. 17/174,681, filed Feb. 12, 2021, entitled "Devices and Methods for Network Message Sequencing", Marjan Radi et al.
Pending U.S. Appl. No. 17/175,449, filed Feb. 12, 2021, entitled "Management of Non-Volatile Memory Express Nodes", Marjan Radi et al.
Botelho et al.; "On the Design of Practical Fault-Tolerant SDN Controllers"; Sep. 2014; 6 pages; available at: http://www.di.fc.ul.pt/~bessani/publications/ewsdn14-ftcontroller.pdf.
Huynh Tu Dang; "Consensus Protocols Exploiting Network Programmability"; Mar. 2019; 154 pages; available at: https://doc.rero.ch/record/324312/files/2019INFO003.pdf.
Jialin Li; "Co-Designing Distributed Systems with Programmable Network Hardware"; 2019; 205 pages; available at: https://digital.lib.washington.edu/researchworks/bitstream/handle/1773/44770/Li_washington_0250E_20677.pdf?sequence=1&isAllowed=y.
Liu et al.; "Circuit Switching Under the Radar with REACToR"; Apr. 2-4, 2014; 16 pages; USENIX; available at: https://www.usenix.org/system/files/conference/nsdi14/nsdi14-paper-liu_he.pdf.
Written Opinion dated Feb. 20, 2020 from International Application No. PCT/US2019/068360, 4 pages.
International Search Report and Written Opinion dated Apr. 27, 2020 from International Application No. PCT/US2019/068269, 6 pages.
Ibrar et al.; "PrePass-Flow: A Machine Learning based Technique to Minimize ACL Policy Violation Due to Links Failure in Hybrid SDN"; Nov. 20, 2020; Computer Networks; available at https://doi.org/10.1016/j.comnet.2020.107706.
Saif et al.; "IOscope: A Flexible I/O Tracer for Workloads' I/O Pattern Characterization"; Jan. 25, 2019; International Conference on High Performance Computing; available at https://doi.org/10.1007/978-3-030-02465-9_7.
Zhang et al.; "PreFix Switch Failure Prediction in Datacenter Networks"; Mar. 2018; Proceedings of the ACM on the Measurement and Analysis of Computing Systems; available at: https://doi.org/10.1145/3179405.
Pending U.S. Appl. No. 17/353,781, filed Jun. 21, 2021, entitled "In-Network Failure Indication and Recovery", Marjan Radi et al.
International Search Report and Written Opinion dated Oct. 28, 2021 from International Application No. PCT/US2021/039070, 7 pages.
Liu et al.; "DistCache: provable load balancing for large-scale storage systems with distributed caching"; FAST '19 Proceedings of the 17th USENIX Conference on File and Storage Technologies; Feb. 2019; pp. 143-157 (Year 2019).
Radi et al.; "OmniXtend: direct to caches over commodity fabric"; 2019 IEEE Symposium on High-Performance Interconnects (HOTI); Santa Clara, CA; Aug. 2019; pp. 59-62 (Year 2019).
Wang et al.; "Concordia: Distributed Shared Memory with In-Network Cache Coherence"; 19th USENIX Conference on File and Storage Technologies; pp. 277-292; Feb. 2021.

* cited by examiner

| Address | Mem. Device | Other Nodes | Status | Version | Timestamp |
|---|---|---|---|---|---|
| A | $110_4$ | 114C | S | 1 | 4/1/19:12:04:02 |
| B | $110_6$ | 114D | M | 2 | 4/2/19:20:38:16 |
| C | $110_2$ | 114A, 114B | S | 2 | 4/1/19:10:20:17 |
| D | $110_1$ | - | E | 3 | 4/2/19:20:51:25 |
| ... | ... | ... | ... | ... | ... |

| Layer | | | | | | | | | |
|---|---|---|---|---|---|---|---|---|---|
| Size | Preamble | Start Of Frame Delimiter | MAC Destination | MAC Source | 802.1Q Tag (optional) | Ethertype or Length | Payload | CRC | Interpacket Gap |
| 2 | | | 6 octets | 6 octets | 4 octets | 2 octets | 46-1500 octets | 4 octets | |
| | | | | 30 : 4 octets | | | 32 : 60-1518 octets | | |
| 1 | 7 octets | 1 octet | | | | | | | 12 octets |

| Format | OpCode | Parameter | Size | Domain | Source |
|---|---|---|---|---|---|
| 3Bits | 3Bits | 3Bits | 4Bits | 3Bits | 16Bits | ns.
FAULT TOLERANT DATA COHERENCE IN LARGE-SCALE DISTRIBUTED CACHE SYSTEMS

CROSS-REFERENCE TO RELATED APPLICATION

This application claims the benefit of U.S. Provisional Application No. 62/842,959 entitled "DISTRIBUTED BRANCH PREDICTION WITH IN-NETWORK PREFETCH", filed on May 3, 2019, which is hereby incorporated by reference in its entirety.

BACKGROUND

Today's memory and computation resources of data centers are struggling to keep up with greater data and bandwidth needs, such as for big data and machine learning applications. Although caching techniques such as memory access prediction and data prefetch have been used in a single device with a Central Processing Unit (CPU) and main memory, such techniques have not been developed for distributed caches where cache lines would be accessed by different processing nodes from one or more memory nodes over an Ethernet fabric. Conventional network latencies in transferring data between processing nodes and memory nodes have generally limited the use of such distributed caches.

However, the emergence of high-performance networking (e.g., 100 Gb/s per link and 6.4 Tbit/s aggregate throughput) using Software Defined Networking (SDN) means that the network may no longer be the performance bottleneck in implementing a distributed cache on a network. In this regard, the data transfer latency of conventional fixed-function networking, as opposed to more recent SDN, can be three orders of magnitude greater than typical memory device data access latencies. For example, data transfer latencies with conventional fixed-function networking is typically in terms of hundreds of microseconds, as compared to data access latencies in terms of hundreds of nanoseconds for memory devices such as Dynamic Random Access Memory (DRAM) or Static Random Access Memory (SRAM).

Although newer high-performance networking may provide an acceptable fabric for a distributed cache, challenges remain in maintaining the coherency of copies of data at different processing and memory nodes in the distributed cache system. In addition, there remain problems with interoperability of different types of processing and memory nodes and fault tolerance in a network fabric, such as an Ethernet fabric, where hardware or link failures can cause system unavailability, packet drop, reordering, or duplication, as compared to the ordered and reliable interconnect or bus communication for a conventional cache used by a CPU and a main memory in a single device.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 4 provides an example cache directory according to one or more embodiments.

FIG. 6A depicts an example Ethernet packet format according to one or more embodiments.

FIG. 6B depicts an example custom header format for the Ethernet packet format of FIG. 6A according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Distributed Cache Examples

Figure 1:
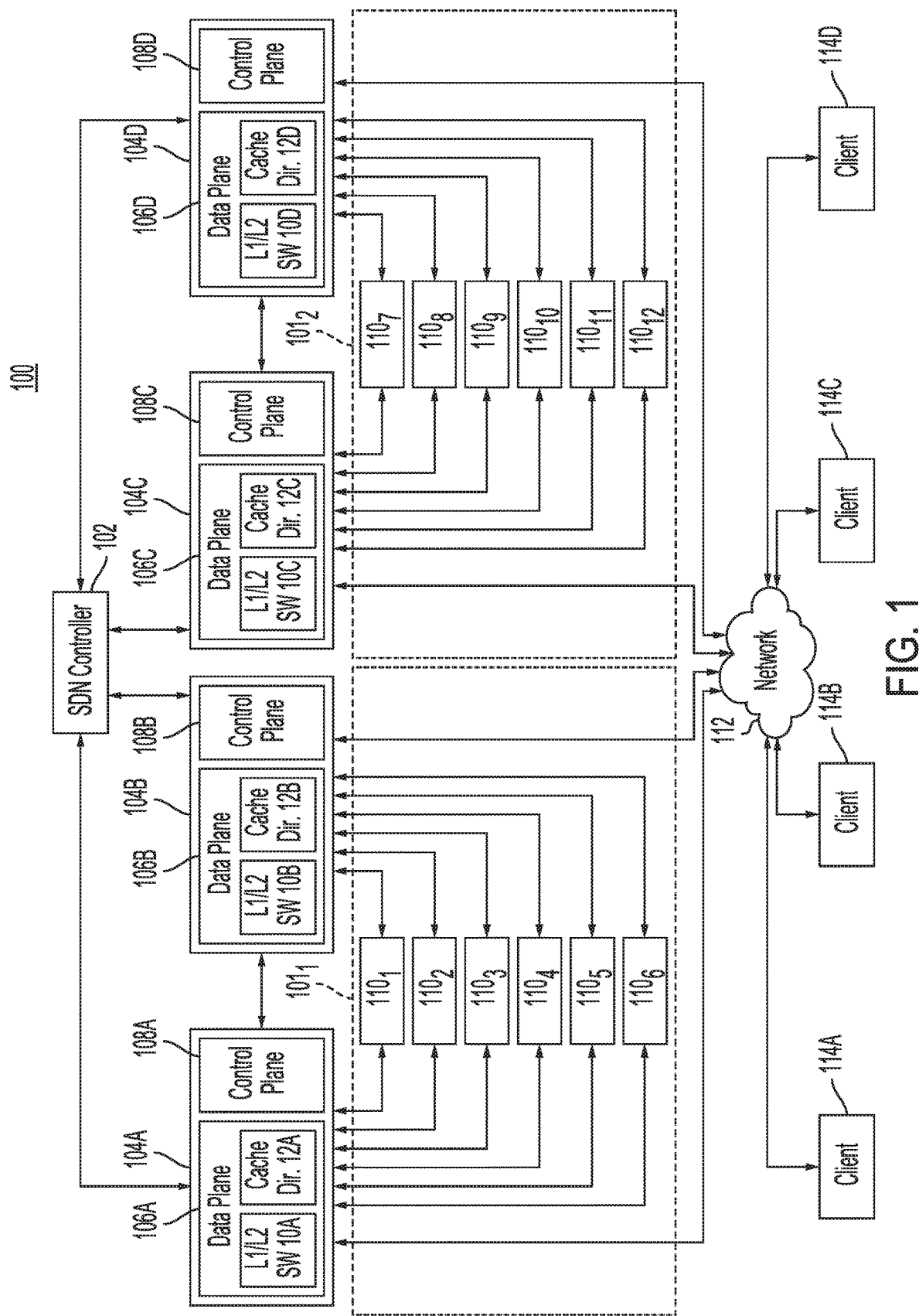
FIG. 1 illustrates a system environment for implementing a distributed cache according to one or more embodiments.

FIG. 1 illustrates an example system environment for implementing a distributed cache according to one or more embodiments. As shown in FIG. 1, clients 114A, 114B, 114C, and 114D and server racks $101_1$ and $101_2$ are connected to network 112 in system 100. Clients 114A to 114D can include, for example, servers or processing nodes on network 112, that share memory devices 110 of server racks $101_1$ and $101_2$ for use as an external main memory of the clients. In this regard, data stored in or retrieved from memory devices 110 can include byte-addressable data (i.e., cache lines) to be loaded into a local main memory or processor cache (e.g., L1, L2, or L3 cache) of a client 114. In some implementations, the system environment of FIG. 1 may be used as part of a data center and/or for distributed processing, such as for distributed machine learning or big data analysis.

Network 112 can include, for example, a Storage Area Network (SAN), a Local Area Network (LAN), and/or a Wide Area Network (WAN), such as the Internet. In this regard, one or more of clients 114, SDN controller 102, and/or one or more of server racks 101 may not be physically co-located. Server racks 101, SDN controller 102, and clients 114 may communicate using one or more standards such as, for example, Ethernet, Fibre Channel, and/or Infini-Band.

As shown in the example of FIG. 1, each of server racks 101₁ and 101₂ is connected to two programmable switches 104 and includes six memory devices 110. In some implementations, one of the programmable switches for a rack (e.g., programmable switch 104A or 104B in rack 101₁) may serve as a backup switch in case the other switch fails or if its cache directory 12 becomes corrupted or otherwise unavailable. In other implementations, one or both programmable switches may be included as part of the server rack.

Software Defined Networking (SDN) controller 102 communicates with each of the programmable switches 104 in system 100. As discussed in more detail below, SDN controller 102 can ensure that a global cache directory maintained at SDN controller 102 and local cache directories maintained at programmable switches 104 (e.g., cache directories 12A, 12B, 12C, and 12D) are consistent. Those of ordinary skill in the art will appreciate that other implementations may include a different number or arrangement of memory devices 110, programmable switches 104, or server racks 101 than shown in the example of FIG. 1.

Programmable switches 104A, 104B, 104C, and 104D route memory messages, such as put requests, get requests, and other communications between clients 114 and memory devices 110. For example, such memory messages may include a get request for a specific memory address or a permission level request for a client to modify a cache line requested from a memory device. As discussed in more detail below with reference to the examples of FIGS. 5A to 5C, such permission levels can be used to maintain the coherency of data across devices in the system.

In some implementations, programmable switches 104 can include, for example, a switch that can be programmed to handle different custom protocols. As discussed in more detail below with reference to FIG. 3A, programmable switches 104 include programmable match-action pipelines to provide a configurable data plane and customized packet processing capability. Examples of such programmable switches can be found in co-pending U.S. application Ser. No. 16/548,116, entitled "DISTRIBUTED CACHE WITH IN-NETWORK PREFETCH", by the inventors of the present application, and filed on Aug. 22, 2019, which is hereby incorporated by reference in its entirety.

Data planes 106 of programmable switches 104 in the example of FIG. 1 can control point-to-point packet forwarding behavior of the programmable switch, such as with L1/L2 Ethernet packet switching modules 10A. In addition, data planes 106 include local cache directories 12 that can be updated by programmable switches 104 to maintain data coherency of cache lines stored in memory devices 110. In some implementations, the cache directories 12 at each programmable switch 104 for a given server rack 101 mirror each other so that updates to one cache directory result in the update being performed to the mirrored cache directory 12 at the other programmable switch 104 for the server rack. In such an implementation, each cache directory 12 can track modifications and storage locations for a given cache line stored in a memory device 110 housed in the server rack 101 connected to the programmable switch.

Data planes 106 of programmable switches 104 are programmable and separate from higher-level control planes 108 that determine end-to-end routes for packets between devices in system 100. In this regard, control planes 108 may be used for handling different processes, such as some of the processes in FIGS. 7 to 10 discussed in more detail below.

In one example, programmable switches 104 can be 64 port Top of Rack (ToR) P4 programmable switches, such as a Barefoot Networks Tofino Application Specific Integrated Circuit (ASIC) with ports configured to provide 40 Gigabit Ethernet (GE) frame rates. Other types of programmable switches that can be used as a programmable switch can include, for example, a Cavium Xpliant programmable switch or a Broadcom Trident 3 programmable switch.

The use of a programmable switch allows for the configuration of high-performance and scalable memory centric architectures by defining customized packet formats and processing behavior, such as those discussed below with reference to FIGS. 7 to 10. Programmable switches 104 also allow for a protocol-independent switch architecture and the use of off-the-shelf switches, as opposed to specially designed Networks on a Chip (NoCs), for coherence of data across system 100.

SDN controller 102 provides global cache coherency monitoring and control among programmable switches 104 in managing the distributed cache stored in memory devices 110. Each programmable switch 104 can provide centralized data coherency management for the data stored in the memory devices of its respective server rack 101. As discussed in more detail below, each programmable switch 104 can efficiently update a local cache directory 12 for memory devices 110 that it communicates with as cache line requests are received by the programmable switch 104. The limitation of cache directory 12 to the memory devices 110 that communicate with the programmable switch 104 can also improve the scalability of the distributed cache or ability to expand the size of the distributed cache to new memory devices, such as by adding a new server rack with its own programmable switches and memory devices.

In some implementations, memory devices 110 can include, for example, Storage Class Memories (SCMs) or other types of memory, such as Dynamic Random Access Memory (DRAM) or Static RAM (SRAM), that can store and retrieve data at a byte-addressable size or cache line size, as opposed to a page or block size as in storage devices such as Solid-State Drives (SSDs) or Hard Disk Drives (HDDs). SCMs can include, for example, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or solid-state memory, such as non-volatile NAND memory. Recently developed SCMs can provide non-volatile storage with a fine granularity of access (i.e., byte-addressable or cache line level) and a shorter data access latency, as compared to storage devices, such as an SSD using conventional flash memory or an HDD using a rotating magnetic disk.

As will be appreciated by those of ordinary skill in the art, system 100 may include additional devices or a different number of devices than shown in the example of FIG. 1. For example, some implementations may include a different number of clients 114, racks 101, switches 104, SDN controllers 102, or memory devices 110.

Figure 2:
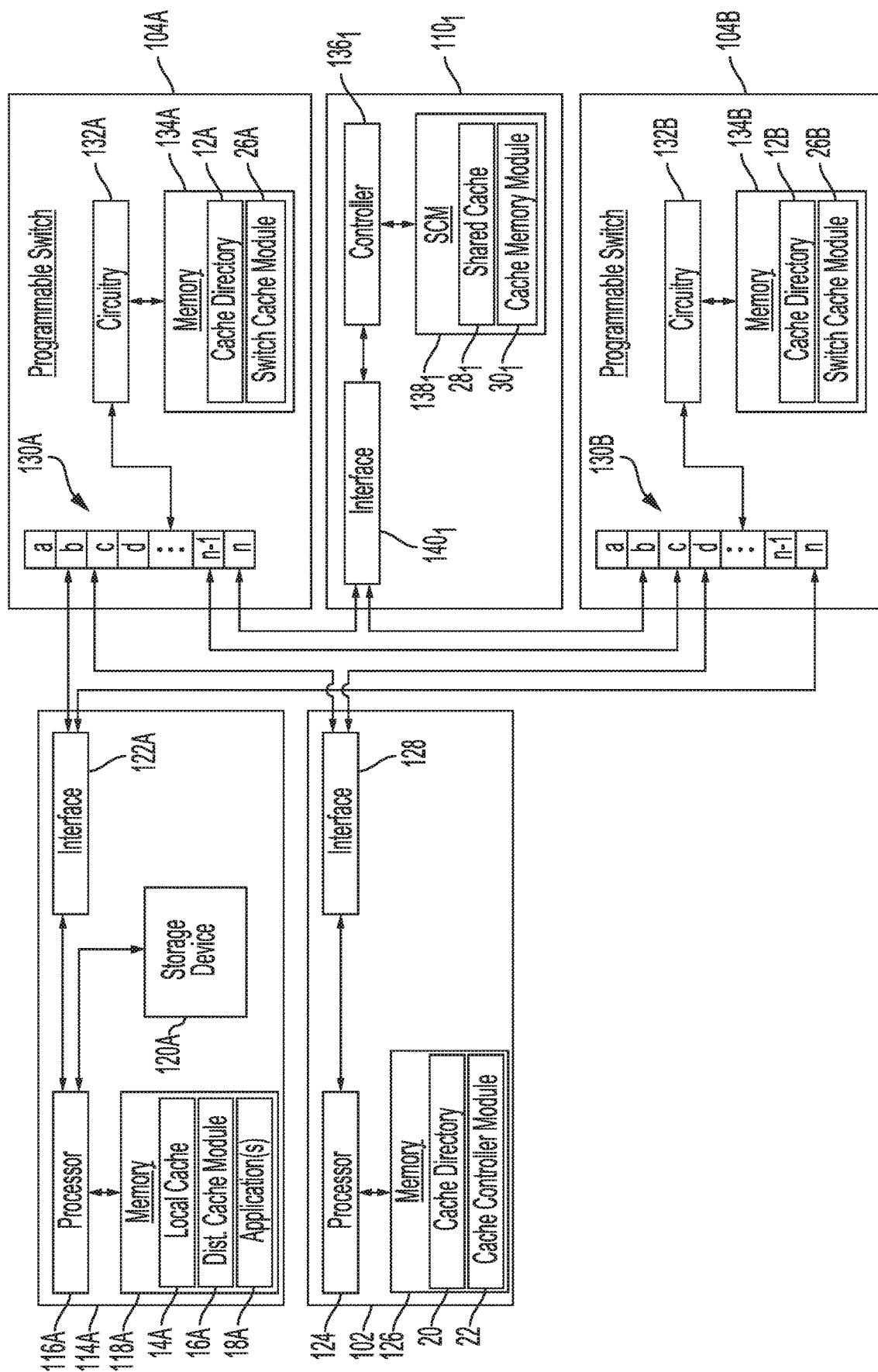
FIG. 2 is a block diagram of example components included in the system environment of FIG. 1 according to one or more embodiments.

FIG. 2 is a block diagram of example components included in system 100 of FIG. 1 according to one or more embodiments. As shown in FIG. 2, client 114A includes processor 116A, memory 118A, storage device 120A, and interface 122A for communicating on network 112. Although only client 114A is shown in the example of FIG.

2, clients 114B, 114C, and 114D from FIG. 1 may have similar or different components as client 114A.

Processor 116A can execute instructions, such as instructions from distributed cache module 16A, and application(s) 18A, which may include an Operating System (OS) and/or other applications used by client 114A. Processor 116A can include circuitry such as a Central Processing Unit (CPU), Graphics Processing Unit (GPU), microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 116A can include a System on a Chip (SoC), which may be combined with one or both of memory 118A and interface 122A. Processor 116A can include one or more cache levels (e.g., L1, L2, and/or L3 caches) where data is loaded from or flushed into memory 118A, or loaded from or flushed into memory devices 110, such as memory device $110_1$ in FIG. 2, via programmable switch 104A or programmable switch 104B. Such data can include, for example, portions of code and related data being processed by processor 116A. The data accessed by processor 116A is referred to herein as cache lines that have a particular cache line size, such as 64 bytes, for example.

Memory 118A can include, for example, a volatile RAM such as SRAM, DRAM, a non-volatile RAM, or other solid-state memory that is used by processor 116A as an internal main memory to store data. Data stored in memory 118A can include data read from storage device 120A, data to be stored in storage device 120A, instructions loaded from distributed cache module 16A or application(s) 18A for execution by processor 116A, and/or data used in executing such applications. In addition to loading data from internal main memory 118A, processor 116A also loads data from memory devices 110 as an external main memory or distributed cache. Such data may also be flushed after modification by processor 116A or evicted without modification back into internal main memory 118A or an external main memory device 110 via programmable switch 104A or programmable switch 104B.

As shown in FIG. 2, memory 118A stores distributed cache module 16A, which can provide instructions for retrieving, storing, or maintaining coherency of cache lines stored in memory devices 110 in system 100. Such instructions can include a protocol for maintaining coherency of data (e.g., cache lines) stored on different devices of system 100 and handling communications with programmable switches 104. In some implementations, distributed cache module 16A can include a driver used by an OS of client 114A.

Storage device 120A serves as secondary storage that can include, for example, one or more rotating magnetic disks or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof. As noted above internal main memory 118A and external memory devices 110 typically provide faster data access and can provide more granular data access (e.g., cache line size or byte-addressable) than storage device 120A.

Interface 122A is configured to interface client 114A with devices in system 100, such as programmable switches 104A and 104B. Interface 122A may communicate using a standard such as, for example, Ethernet, Fibre Channel, or InfiniBand. In this regard, client 114A, programmable switches 104A and 104B, SDN controller 102, and memory device $110_1$ may not be physically co-located and may communicate over a network such as a LAN or a WAN. As will be appreciated by those of ordinary skill in the art, interface 122A can be included as part of processor 116A.

Programmable switches 104A and 104B in some implementations can be ToR switches for server rack $101_1$ including memory device $110_1$. In the example of FIG. 2, programmable switches 104A and 104B include ports 130A and 130B, respectively, circuitry 132A and 132B, respectively, and memories 134A and 134B, respectively. Ports 130 provide a connection and are configured to communicate with devices, such as clients 114 in FIG. 1, SDN controller 102, and memory devices 110 in server rack $101_1$. For example, ports 130 may include Ethernet, Fibre Channel, or InfiniBand ports. Circuitry 132A or 132B can include circuitry such an ASIC, a microcontroller, a DSP, an FPGA, hard-wired logic, analog circuitry and/or a combination thereof. In some implementations, circuitry 132A or 132B can include an SoC, which may be combined with memory 134A or memory 134B, respectively.

Memory 134 of a programmable switch 104 can include, for example, a volatile RAM such as DRAM, or a non-volatile RAM or other solid-state memory such as register arrays that are used by circuitry 132 to execute instructions loaded from switch cache module 26 or firmware of the programmable switch 104, and/or data used in executing such instructions, such as cache directory 12. In this regard, and as discussed in more detail below, switch cache module 26 can include instructions for implementing processes such as those discussed with reference to FIGS. 7 to 10 below to maintain coherency of data in memory devices $110_1$ to $110_{12}$ using cache directory 12.

In the example of FIG. 2, memory device $110_1$ includes $SCM\ 138_1$ that allows cache lines to be retrieved from and stored in shared cache $28_1$ for use by clients 114. Although shared cache $28_1$ is shown as being stored in an SCM, other implementations may include a different type of memory for storing shared cache $28_1$. As shown in FIG. 2, $SCM\ 138_1$ also stores cache memory module $30_1$, which provides instructions for controller $136_1$ to implement cache coherency processes and a communication protocol for interfacing with programmable switches 104. Controller $136_1$ controls operation of memory device $110_1$, and can include circuitry such as a microcontroller, a DSP, an FPGA, an ASIC, hard-wired logic, analog circuitry and/or a combination thereof. In some implementations, controller $136_1$ can include an SoC, which may be combined with interface $140_1$, and/or $SCM\ 138_1$. Interface $140_1$ is configured to interface with ports of programmable switches 104A and 104B, and may interface according to a standard, such as Ethernet, Fibre Channel, or InfiniBand.

SDN controller 102 in the example of FIG. 2 maintains global cache directory 20. As discussed in more detail below with reference to the process of FIGS. 8 and 10, SDN controller 102 receives updates from programmable switches 104 via interface 128 indicating updates or changes to a local cache directory maintained by the programmable switch 104 (i.e., cache directory 12A or cache directory 12B). SDN controller 102 may request version numbers or other indications of cache lines that have been modified or have an entry that has been updated since a previous request. This can allow SDN controller 102 to confirm that its cache directory 20 stored in memory 126 is up to date, and make any necessary changes. In addition, SDN controller 102 can allow for fault tolerance or redundancy in the case were both programmable switches 104 for a particular server rack may not be available due to an error or loss of power, for example. SDN controller 102 may also send updates to one or more programmable switches 104 for updating a local cache directory 24 based on information received from another programmable switch.

Processor 124 of SDN controller 102 executes cache controller module 22 to maintain global cache directory 20 and update local cache directories 12 at programmable switches 104, as needed. Processor 124 can include circuitry such as a CPU, GPU, microcontroller, a DSP, an ASIC, an FPGA, hard-wired logic, analog circuitry and/or a combination thereof. In some implementations, processor 124 can include an SoC, which may be combined with one or both of memory 126 and interface 128. Memory 126 can include, for example, a volatile RAM such as DRAM, a non-volatile RAM, or other solid-state memory that is used by processor 124 to store data. SDN controller 102 communicates with programmable switches 104 via interface 128, which is configured to interface with ports of programmable switches 104A and 104B, and may interface according to a standard, such as Ethernet, Fibre Channel, or InfiniBand.

As will be appreciated by those of ordinary skill in the art, other implementations may include a different arrangement or number of components, or modules than shown in the example of FIG. 2. For example, in some implementations, client 114A may not include storage device 120A or SCM $138_1$ may be replaced by a DRAM.

Figure 3A:
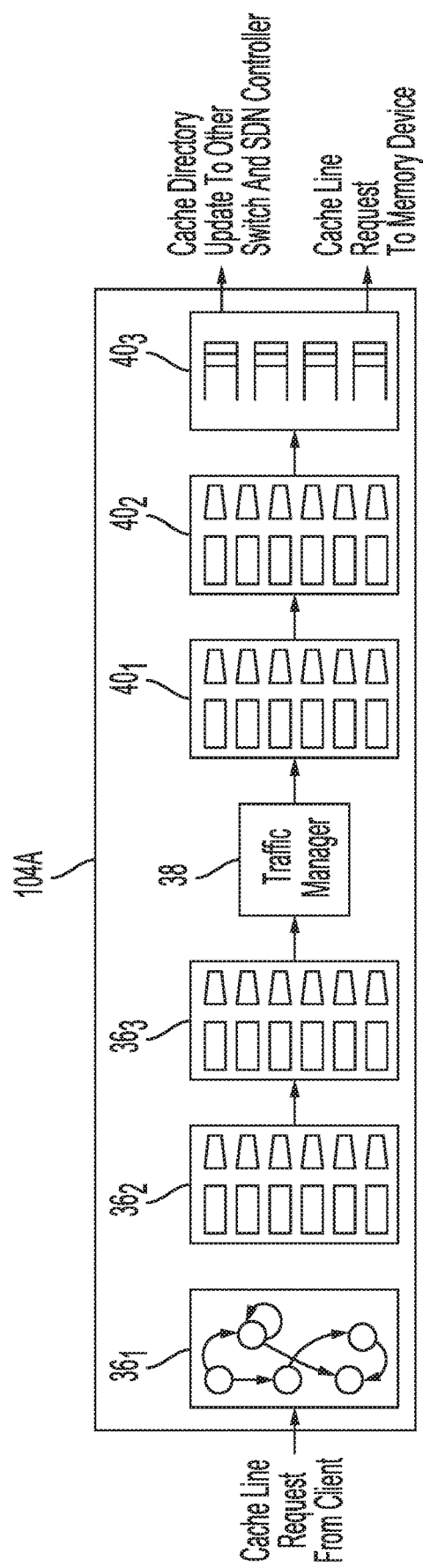
FIG. 3A illustrates example modules in a pipeline of a programmable switch according to one or more embodiments.

FIG. 3A depicts example modules in a pipeline of programmable switch 104A according to one or more embodiments. As shown in FIG. 3A, the pipeline for programmable switch 104A can include parser $36_1$, ingress stages $36_2$ and $36_3$, traffic manager 38, egress stages $40_1$ and $40_2$, and deparser $40_3$. Each of these modules may be programmed, such as by using P4, to handle a custom packet header and protocol. In addition, the example modules of programmable switch 104A shown in FIG. 3A can be implemented by circuitry 132A and memory 134A in FIG. 2, which is capable of parallel processing of packets in sequential stages.

In the example of FIG. 3A a cache line request is received from a client 114 as a packet by parser module $36_1$ of programmable switch 104A. For its part, parser module $36_1$ is configured to extract packet headers and values from the packet headers, such as a destination address, operation type, or a source address, for match-action operations performed by the ingress and egress stages. The extracted header values are fed into the ingress pipeline that includes stages $36_2$ and $36_3$.

As noted above, memory messages can have a custom packet format so that programmable switch 104A can distinguish memory messages, such as messages for cache line addressed data, from other network traffic, such as messages for page addressed data. The indication of a memory message, such as a cache line request to put or get cache line data, causes circuitry 132A of programmable switch 104A to handle the packet differently from other packets that are not indicated as being a memory message. In some implementations, the custom packet format fits into a standard 802.3 Layer 1 frame format, which can allow the packets to operate with existing and forthcoming programmable switches, such as a Barefoot Tofino ASIC switch, for example. In such an implementation, the preamble, start frame delimiter, and interpacket gap may follow the standard 802.3 Layer 1 frame format, but portions in Layer 2 are replaced with custom header fields that can be parsed by programmable switch 104A. A payload of a packet for a memory message can include one or more memory addresses for one or more cache lines being requested by a client or being returned to a client, and may include data for the cache line or lines.

Stages $36_2$ and $36_3$ can include, for example programmable Arithmetic Logic Units (ALUs) and one or more memories that store match-action tables for matching extracted values from the headers and performing different corresponding actions based on the values, such as performing particular updates to cache directory 12A stored in memory 134A of programmable switch 104A. In some implementations, the stages of the ingress pipeline and the egress pipeline may share a single memory, such as memory 134A in FIG. 2. The matches and corresponding actions are made according to predefined rules and the extracted packet header values.

Traffic manager 38 routes the cache line request to an appropriate port of programmable switch 104A. As discussed in more detail in co-pending application Ser. No. 16/548,116, entitled "DISTRIBUTED CACHE WITH IN-NETWORK PREFETCH", filed on Aug. 22, 2019, and incorporated by reference above, the ingress pipeline in some implementations may calculate offsets for additional cache lines to be prefetched based on the parsed header fields, and then generates corresponding additional cache line request packets using a packet generation engine of programmable switch 104A.

In the example of FIG. 3A, the egress pipeline includes stages $40_1$ and $40_2$ that can each include ALUs and memories or portions of memory 134A that can be used for performing additional match-actions for an outgoing cache line request. The frames are then assembled in packets by deparser $40_3$ for the outbound cache line requests before leaving programmable switch 104A by, for example, merging processed headers and a payload.

As will be appreciated by those of ordinary skill in the art, other implementations may include a different arrangement of modules for a programmable switch. For example, other implementations may include more or less stages as part of the ingress or egress pipeline.

Figure 3B:
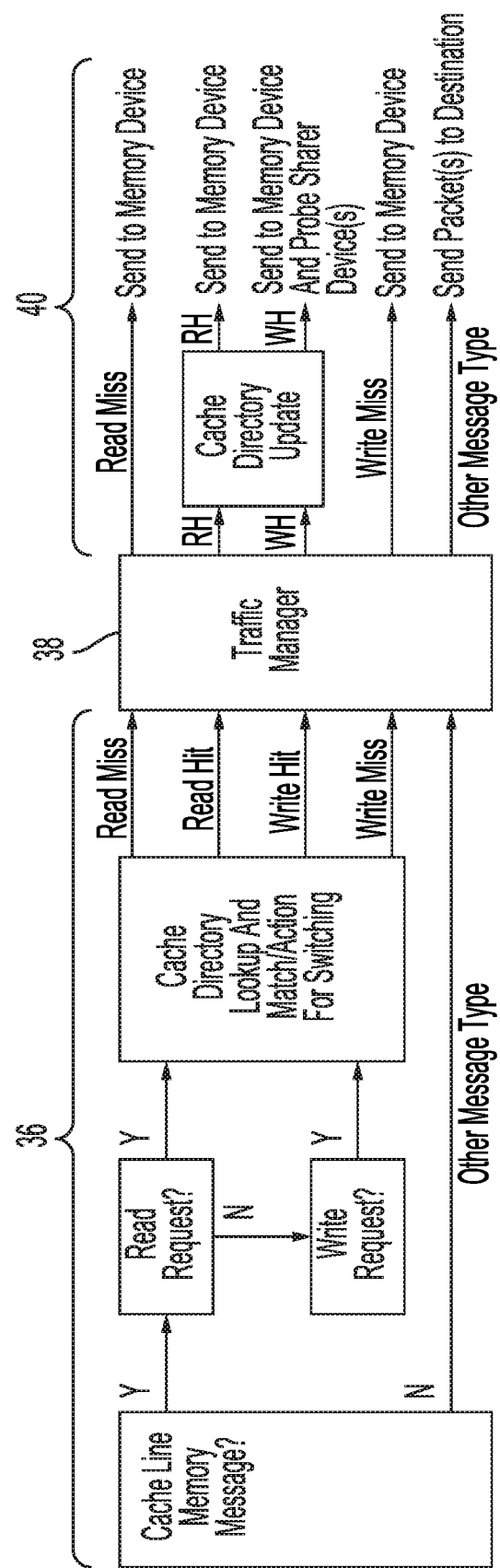
FIG. 3B illustrates example operations performed by the modules of FIG. 3A according to one or more embodiments.

FIG. 3B illustrates example operations performed by the modules of FIG. 3A according to one or more embodiments. As shown in FIG. 3B, ingress pipeline 36, including parser $36_1$ and ingress stages $36_2$ and $36_3$, determines whether incoming messages are cache line memory messages for a distributed cache stored in memory devices 110. In some implementations parser $36_1$ may extract a header from the incoming message and an ingress stage may compare a value in the header indicating that the message is a cache line memory message intended for the distributed cache.

If the incoming message is a cache line memory message, such as a get or a put cache line request to retrieve or store a cache line, respectively, ingress pipeline 36 determines whether the cache line memory message is a read request or a write request. As discussed in the example header format of FIG. 6B, a field in the header can indicate an operation code indicating an operation, such as a read or write operation, that the device sending the cache line memory message intends to perform on requested data. Ingress pipeline 36 performs a lookup operation in cache directory 12 to identify a memory device 110 storing the requested cache line. If an address for the cache line is already in cache directory 12, the cache line request is treated as a read hit or a write hit depending on the operation code. If the address for the cache line is not in cache directory 12, the cache line request is treated as a read miss or write miss depending on the operation code.

If the incoming message is not a cache line memory message, such as a read or write command in units greater than a cache line size (e.g., in a page or block size), the message or portions of the message, such as a header and a payload, are passed to traffic manager 38, which can determine a port for sending the message. In some implementation, a destination address in the header can indicate a port to send the message via egress pipeline 40, which may reassemble the message before sending the message to another device in system 100.

In the case where the incoming message is a cache line memory message, match-action tables of one or more of stages $36_2$ and $36_3$ may be used to determine a memory device 110 storing the requested cache line or cache lines. In this regard, the memory device 110 may serve as a home node or serialization point for the cache lines it stores by allowing access and granting permission levels for modification of the cache lines to other nodes or devices in system 100. Traffic manager 38 can determine a port for sending the cache line request to the identified memory device 110 storing the requested cache line.

In the cases of a read miss or a write miss, egress pipeline 40 including deparser $40_3$ reassembles or builds one or more packets for the cache line request and sends it to the identified memory device 110. In the cases, of a read hit or a write hit, one or more of egress stages $40_1$ and $40_2$ may be used to update cache directory 12. In some examples, a status or permission level, and/or a version number may be changed in cache directory 12 for an entry corresponding to the requested cache line. The read request may be reassembled or built by deparser $40_3$, and sent to the identified memory device 110 storing the requested data.

In the example of a write request, egress pipeline 40 may use one or more of egress stages $40_1$ and $40_2$ to identify other nodes or devices in system 100 storing a copy of the requested cache line or lines and a status or permission level for the requested data. In such examples, egress pipeline 40 may also send cache line requests to the other nodes or devices to change a status or permission level of such other nodes. For example, a request to modify a cache line that is being shared by multiple nodes in addition to the memory device 110 storing the cache line can result in egress pipeline 40 sending cache line requests to the other nodes to change their permission level from shared to invalid for the cache line requested from memory device 110.

As will be appreciated by those of ordinary skill in the art, other arrangements of operations performed by programmable switch 104 are possible than those shown in the example of FIG. 3B. For example, some implementations may include creating new entries in cache directory 12 for cache lines received from memory device 110 or routing of cache lines to clients 114. In addition, and as discussed in more detail below with reference to FIGS. 8 to 10, such operations may include, for example, sending indications of cache directory updates to another programmable switch 104 or to SDN controller 102, handling additional cache line requests received for the same data, and/or sending version numbers for cache lines that have been modified to SDN controller 102.

FIG. 4 provides an example of cache directory 12A maintained by programmable switch 104A according to one or more embodiments. In the example of FIG. 4, cache directory 12A may be a single data structure or may be formed of multiple data structures stored at programmable switch 104A, which may include a memory directly connected to and used by programmable switch 104A. As discussed above, a mirrored cache directory (e.g., cache directory 12B) may be stored at another programmable switch 104 for the same server rack 101 or set of associated memory devices 110, as well as at SDN controller 102.

As shown in FIG. 4, cache directory 12A stored at programmable switch 104A includes addresses for different cache lines stored in memory devices 110 in communication with programmable switch 104A (e.g., memory devices $110_1$ to $110_6$ in FIG. 1). For each address or entry in cache directory 12A, the memory device 110 storing the corresponding cache line is indicated, in addition to an indication of other nodes or devices that store a copy of the cache line, a status for the cache lines, a version number for the cache line, and a timestamp for when the cache line was last modified or authorized to be modified by its home memory device 110.

In some cases, an address or other indicator of the memory device 110 storing the cache line may be included as part of the address for the cache line. As shown in the example of FIG. 4, a copy of the cache lines corresponding to addresses A and B are stored at clients 114C and 114D, respectively, in addition to the main cache lines for addresses A and B, which are stored at memory devices $110_4$ and $110_6$, respectively. The status for the cache line indicated by address A is shared (i.e., S in FIG. 4), meaning that client 114C has read-only access that can be shared with other nodes. In addition, the version number of 1 for the cache line corresponding to address A indicates that it has not been modified since it was originally stored in memory device $110_4$ at a particular time indicated by the timestamp.

In this regard, different devices in a system implementing a distributed cache may not be exactly synchronized with each other. In some implementations, this challenge is overcome by using the time provided by the home memory device 110 that stores the requested data. Programmable switch 104 may receive this time in a cache line memory message from memory device 110 with the requested data. The use of the home memory device 110 that stores the requested data as the serialization point or timekeeper for the requested data can provide a consistent timestamp for the requested data and allow for scalability of the distributed cache without having to synchronize timekeeping among an increasing number of devices at a central location.

In the example of cache directory 12A in FIG. 4, the status of the cache line indicated by address B is modified (i.e., M in FIG. 4), meaning that client 114D has write access to the cache line. The version number of 2 for the cache line indicates that it has been modified twice since it was originally stored in memory device $110_6$ at the time indicated by the timestamp for the cache line.

The cache line indicated by address C in cache directory 12A is stored in memory device $110_2$, and has shared read-only copies of the cache line stored at clients 114A and 114B. The cache line has been modified twice since it was originally stored in memory device $110_2$, and was last modified or authorized to be modified by its home memory device $110_2$ at the time indicated by the corresponding timestamp in cache directory 12A.

As shown in FIG. 4, the cache line indicated by address C is stored in memory device $110_1$ with no copies at other nodes or devices. Memory device $110_1$ has exclusive access or permission (i.e., status of E in FIG. 4) to modify the cache line, which has been modified three times since being originally stored in memory device $110_1$, as indicated by its version number of 3. The last modification or authorization for modification is provided by the timestamp for the cache line indicated by address C.

As will be appreciated by those of ordinary skill in the art, cache directory 12A may include different information than that shown in FIG. 4. For example, some implementations of cache directory 12A may include usage statistics for different cache lines or may not include a separate indication of the memory device storing the cache line since this may be indicated by the address for the cache line. In some implementations, the status in cache directory 12A may only indicate whether a modification of the cache line is in progress, as opposed to a shared, modified, or exclusive status. As another example variation, different cache lines with contiguous addresses may be consolidated in cache directory 12A by representing the cache lines as a range of addresses, so long as the respective information (e.g., memory device location, other nodes, status, version number, and timestamp) remain the same for all cache lines in the address range.

Figure 5A:
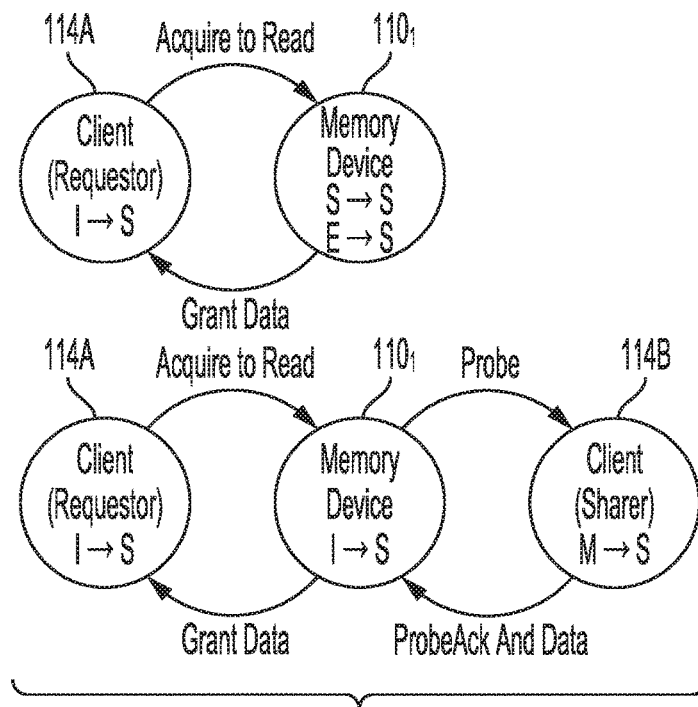
FIG. 5A provides state diagrams for the acquisition of a cache line to be read by a client according to one or more embodiments.
Figure 5B:
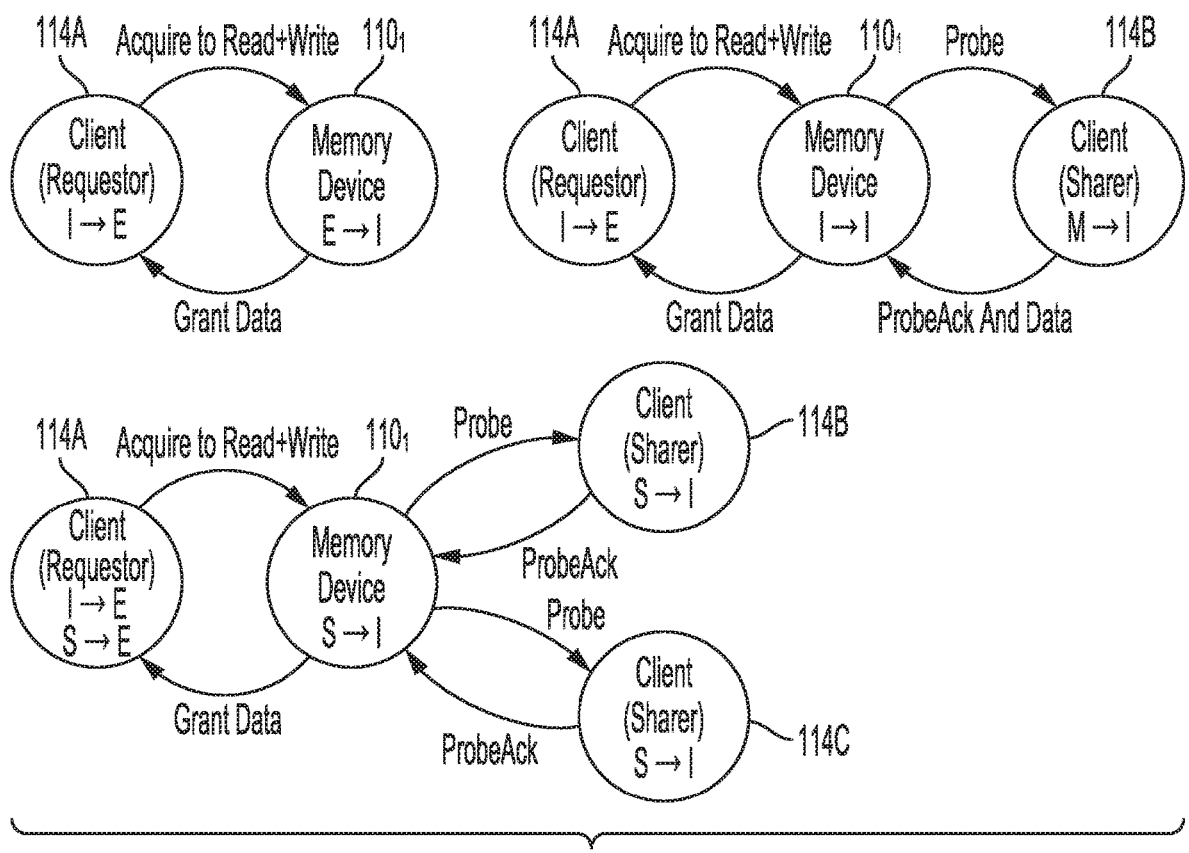
FIG. 5B provides state diagrams for the acquisition of a cache line to be written by a client according to one or more embodiments.
Figure 5C:
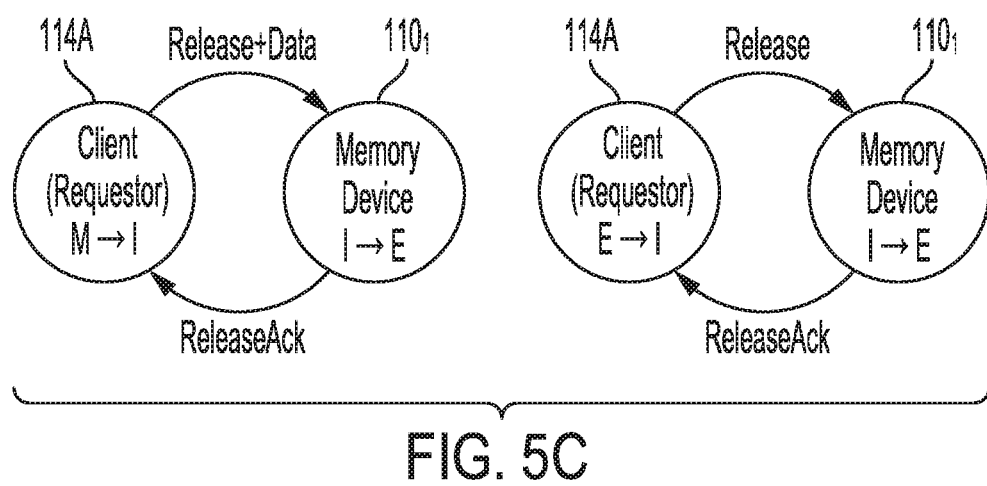
FIG. 5C provides state diagrams for the release of a permission level from a client according to one or more embodiments.

FIGS. 5A to 5C provide example state diagrams for maintaining the coherency of cache lines across the distributed cache. As discussed below with reference to FIGS. 6A and 6B, cache line requests may follow a packet format including one or more fields indicating a permission level requested by a client to perform an operation using the requested cache data.

FIG. 5A illustrates the acquisition of one or more cache lines to be read by a client according to one or more embodiments. As shown in the top half of FIG. 5A, client 114A serves as a requestor that sends a cache line request to acquire one or more cache lines to read from memory device $110_1$. As discussed in more detail below, the intended operation of client 114A on the requested data can be provided with the packet as part of the request using a particular packet protocol such as the protocol described below for FIGS. 6A and 6B. Client 114A may implement the packet protocol using distributed cache module 16 executed by processor 116A.

In FIG. 5A, the permission level or status of client 114A with respect to the requested data changes from an invalid state to a shared state. This is shown in FIG. 5A with the permission level of client 114A with respect to the requested cache line changing from I to S after memory device $110_1$ has granted the request and provided the requested data to client 114A through a programmable switch, such as programmable switch 104A. Client 114A may implement the change in permission level using distributed cache module 16 executed by processor 116A.

For its part, memory device $110_1$ receives the cache line request from client 114A and either maintains a shared permission level (i.e., S in memory device $110_1$) with respect to the requested data or changes its permission level with respect to the requested data from exclusive to shared (i.e., E to S in FIG. 5A) to indicate that memory device $110_1$ is no longer the only node that has read and write permission for the requested data. The shared state indicates that the node has read-only permission to the data, that the data is valid and clean (i.e., does not have a more recent modified version at another device), and that other nodes or devices may also have a read-only copy of the data. The exclusive state also indicates that the requested data is valid and clean, but that the node or device is the only node in system 100 that has read and write permission to the data. Memory device $110_1$ may implement the change in permission level using cache memory module $30_1$ executed by controller $136_1$.

In the bottom half of FIG. 5A, memory device $110_1$ has an initial state of invalid for the requested data, meaning that memory device $110_1$ does not have permission to read or modify the requested data. In response to receiving a cache line request from client 114A via a programmable switch 104 to acquire one or more cache lines to read, memory device $110_1$ probes client 114B, which has modified the requested data. The probe from memory device $110_1$ forces a change in the permission level of client 114B with respect to the requested data. Specifically, the state of client 114B with respect to the requested cache line or lines changes from modified to shared (i.e., M to S in FIG. 5A) to relinquish permission to the requested data. Client 114B sends the modified version of the data back to memory device $110_1$ with an acknowledgement of the probe. Memory device $110_1$ then provides client 114A with the requested data and permission to read the data. In response, client 114A changes its status with respect to the requested cache line from invalid to shared (i.e., I to S in FIG. 5A).

As noted above, the present disclosure uses programmable switch 104 to maintain the cache directory for its respective memory devices 110. This ordinarily provides an efficient way to maintain cache directories 12 for the distributed cache, since programmable switch 104 serves as an intermediary or centralized location for communication between clients 114 and its memory devices 110. Programmable switch 104 can update its cache directory 12 based on the cache line requests it receives for memory devices 110 without having to coordinate among a larger number of caches located at a greater number of clients 114 or memory devices 110. Using programmable switch 104 to update a local cache directory also improves scalability of the distributed cache, since, in certain implementations, each programmable switch is responsible for only the cache lines stored in its associated set of memory devices 110.

FIG. 5B provides example state diagrams for when client 114A requests one or more cache lines to be modified. In the top left example state diagram of FIG. 5B, client 114A as the requestor requests data from memory device $110_1$ for both reading and writing. Memory device $110_1$, which has the only copy of the requested cache line or lines, changes its status with respect to the requested data from exclusive to invalid (i.e., E to I in FIG. 5B), and provides the requested data to client 114A. Client 114A changes its status with respect to the requested data from invalid to exclusive to indicate that it is the only node with permission to write or modify the requested data.

The top right example state diagram of FIG. 5B illustrates a case where memory device $110_1$ does not have the current copy of the requested data. When memory device $110_1$ receives the request from client 114A to read and write to the requested data, memory device $110_1$ probes client 114B for the requested data, which forces the permission level of client 114B with respect to the requested data from modified to invalid (i.e., M to I in FIG. 5B). The modified or current version of the requested data is sent from client 114B to memory device $110_1$ with a probe acknowledgment. Memory device $110_1$ forwards the requested data back to client 114A and grants permission to modify the data. Client 114A then changes its status with respect to the requested data from invalid to exclusive (i.e., I to E in FIG. 5B) to indicate that it is the only node with permission to modify the requested data.

The bottom example state diagram in FIG. 5B illustrates the case where client 114A requests data to modify that is being shared among clients 114B and 114C. Client 114A requests the data from memory device $110_1$, which sends probes for the data to clients 114B and 114C that are sharing copies of the requested data. In response, each of clients 114B and 114C change their status from shared to invalid (i.e., S to I in FIG. 5B) for the requested data and send an acknowledgement back to memory device $110_1$ that their permission level has been changed.

Memory device $110_1$ then sends the requested data to client 114A and grants permission to client 114A to modify the data. The status of memory device $110_1$ with respect to the requested data changes from shared to invalid, while the status of client 114A with respect to the requested data changes from either invalid to exclusive or shared to exclusive, depending on whether client 114A was previously sharing the data with clients 114B and 114C. In cases where client 114A already was sharing the requested data, memory device $110_1$ may only send an indication that the permission level of client 114A can be changed from shared to exclusive, since client 114A already has a copy of the requested data.

FIG. 5C provides example state diagrams for the release of a permission level from client 114A according to one or more embodiments. As shown in the example state diagram on the left side of FIG. 5C, client 114A releases its permission level of modified data after writing to or modifying one or more cache lines by sending an indication of its completion of writing and a copy of the modified data to memory device $110_1$. After receiving the modified cache line or cache lines, memory device $110_1$ changes its permission level with respect to the data from invalid to exclusive and sends an indication of a release acknowledgment back to client 114A. The status of client 114A with respect to the cache line is changed from modified to invalid to indicate that client 114A no longer has permission to modify or otherwise use the cache line.

In the example state diagram on the right side of FIG. 5C, client 114A instead changes its permission level with respect to one or more cache lines from exclusive to invalid. This can indicate that the cache line or cache lines may not have been modified by client 114A, but that the permission level of client 114A has been changed to invalid so that another node, such as another client 114, may modify the data. In this case, client 114A sends an indication of the release of its permission level to memory device $110_1$, which sends a release acknowledgment back to client 114A. Memory device $110_1$ already has a current or valid copy of the data so there is no need for client 114A to send its copy of the data. Memory device $110_1$ then changes its status with respect to the data from invalid to exclusive to indicate that it is the only node that has permission to modify the data.

As discussed above, memory device 110 in the foregoing examples serves as a serialization point for the modification of the data it stores. In other words, the order of performing requests for the same data is typically in the order that memory device 110 receives requests for the data. In addition, memory device 110 uses a non-blocking approach where cache line requests are granted in the order in which they are received. In some implementations, programmable switch 104 may delay additional requests received for data that is in progress of being modified and/or may send a request for a modified copy of the cache line to the client that has modified the data without having to wait for a request from memory device 110 to retrieve the modified data from the client. These features are discussed in more detail below with reference to the cache line request conflict process of FIG. 9.

FIG. 6A depicts an example Ethernet packet format according to one or more embodiments. As shown in the example of FIG. 6A, the packet format fits into a standard 802.3 Layer 1 frame format, which can allow the packets to operate with existing and forthcoming programmable switches, such as a Barefoot Tofino ASIC switch, for example. The preamble, start frame delimiter, and inter-packet gap follow the standard 802.3 Layer 1 frame format, but portions in Layer 2 are replaced with coherence message fields of custom header 30 that can be parsed by a programmable switch 104. Data payload 32 in FIG. 6A can include, for example, one or more cache lines that have been requested from a memory device $110_1$ or one or more modified cache lines that are being flushed back to a memory device $110_1$.

In the example of FIG. 6B, the combination of fields in custom header 30 encodes information for coherence operations. A format field in header 30 can indicate a custom header type, such as by including a code indicating an OmniXtend or other custom header type. This format field may also indicate that the packet is for a cache line memory message, as opposed to another type of message, such as to read or write data in units of a block or page size.

The OpCode field can indicate an operation type for an intended operation to be performed using a requested cache line or cache lines such as acquire to read or acquire to read and write. In other cases, the OpCode field can indicate whether the packet is a probe to change the permission level of a client or a probe acknowledgment to indicate that a permission level has been changed, as discussed above with reference to the example state diagrams of FIGS. 5A to 5C. In this regard, the parameter field of custom header 30 can indicate a current or requested permission level from the device sending the packet.

The size field of header 30 can indicate the size of the data requested (e.g., a number of cache lines or a size in bytes) or the size of the data provided in payload 32. The domain field can provide coherence message ordering guarantees within a subset of messages, and the source field can indicate a source identifier or other identifier for the device that issued the request.

Payload 32 can include, for example, an address or addresses for one or more cache lines that are requested from a programmable switch 104 or may include data for one or more cache lines being returned to a client 114 from a programmable switch 104. In the example of FIG. 6A, payload 32 also includes Cyclic Redundancy Check (CRC) data for ensuring the integrity of the data included in payload 32. Such error checking may be performed by programmable switch 104, memory device 110, and/or client 114 to help ensure that the received data is correct. As discussed above with reference to FIG. 3B, programmable ingress stages of a programmable switch 104 can identify cache line addresses included in the packet and perform match-actions to identify a memory device 110 storing the requested cache lines.

As will be appreciated by those of ordinary skill in the art, other message formats can be used with programmable switches 104 to perform cache line requests and update cache directories 12.

Example Processes

Figure 7:
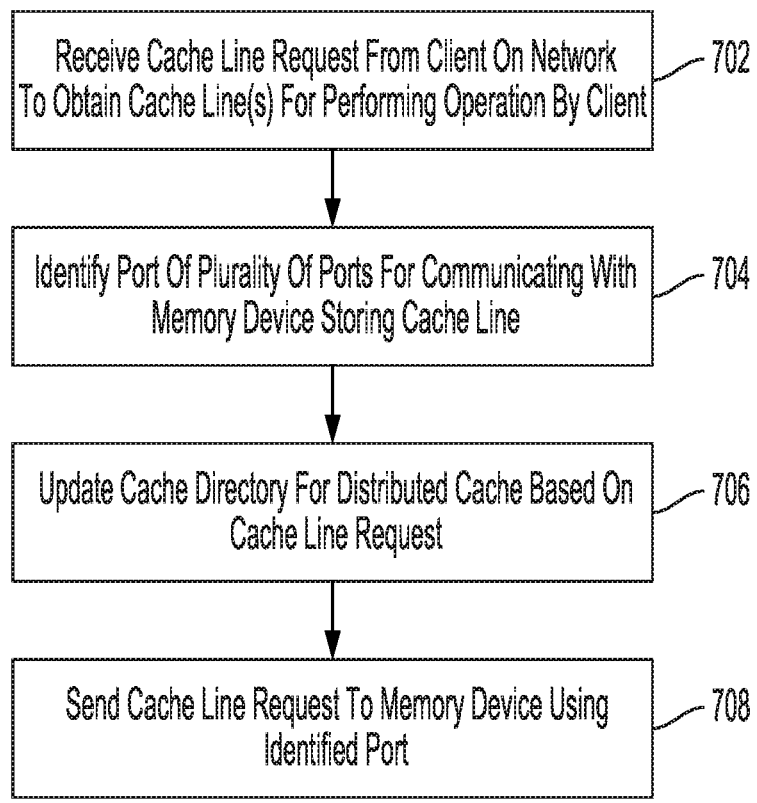
FIG. 7 is a flowchart for a cache line request and port identification process according to one or more embodiments.

FIG. 7 is a flowchart for a cache line request process that can be performed by circuitry 132 of a programmable switch 104 executing switch cache module 26 according to one or more embodiments. As discussed above, programmable switch 104 may be configured to handle cache line requests using a programming language, such as P4, to configure a data plane and a control plane (e.g., data plane 106 and control plane 108 in FIG. 1), and to configure cache directory 12 and match-action tables for ingress and/or egress pipelines of programmable switch 104. The receipt of program instructions or programming may occur during a configuration process of programmable switch 104 when programmable switch 104 is offline or not connected to system 100. In other cases, the programming or program instructions may be received while programmable switch 104 is connected to system 100 and may come from a host or other device in system 100, such as from SDN controller 102, for example.

In block 702, programmable switch 104 receives a cache line request from a client 114 on network 112 to obtain one or more cache lines for performing an operation by the client. As discussed above, the cache line is a size of data that can be used by a processor of the requesting client that would otherwise be accessed from a local main memory of the client in a conventional system. In some implementations, programmable switch 104 may also perform a prefetch process to expand the requested cache line or cache lines to include additional, unrequested cache lines that are predicted to be needed by the requesting client based at least in part on the cache line or lines being requested by the client. Examples of such prefetch processes are provided in co-pending application Ser. No. 16/548,116, entitled "DISTRIBUTED CACHE WITH IN-NETWORK PREFETCH", filed on Aug. 22, 2019, and incorporated by reference above.

In block 704, programmable switch 104 identifies a port of the plurality of ports 130 of programmable switch 104 for communicating with a memory device 110 storing the requested cache line or cache lines. As discussed above with reference to FIGS. 3A and 3B, ingress pipeline 36 including a parser and one or more ingress stages (e.g., parser $36_1$ and stages $36_2$ and $36_3$ in FIG. 3A) can analyze a header of the incoming cache line request, and perform match-actions to identify the memory device 110 storing the requested cache line or lines. In more detail, the identification can be performed as part of an ingress or egress pipeline of programmable switch 104 where headers or frames of packets can be processed in parallel following a parser to identify an address in the cache line request and compare the address to one or more match-action tables that include addresses and a corresponding instruction or action to be taken upon finding a match. Traffic manager 38 of programmable switch 104 may then identify the port for communicating with the memory device 110.

In block 706, programmable switch 104 updates its local cache directory 12 for the distributed cache based on the received cache line request. For example, an egress stage of egress pipeline 40 (e.g., stage $40_1$ or $40_2$ in FIG. 3A) may change a status for the cache line or cache lines in cache directory 12 to modified or in progress of being modified based on an OpCode field in the custom header format of FIG. 6B indicating that the client requesting the data intends to modify the data. In another example, the status in cache directory 12 may be updated to a shared status to indicate a read-only access for the requested data. In other examples, a version number for the requested data may be incremented in response to a request to modify the data or a client 114 may be added or removed from the other nodes list of devices storing a copy of the data.

Although the example discussed above with reference to FIG. 3B shows the updating of cache directory 12 before the cache line request is sent to memory device 110, programmable switch 104 in other implementations may update cache directory 12 after receiving the requested data from memory device 110. In this regard, some or all of the updates to cache directory 12 may be made before or after the requested data has been received from memory device 110. In cases where an update is performed after receiving the requested data from memory device 110, ingress stages and/or egress stages may perform one or more match-actions to update cache directory 12.

In block 708, a cache line request is sent to memory device 110 using the port identified in block 704. As discussed above with the example of FIG. 3A, deparser 403 of programmable switch 104 may reassemble the extracted or processed header 30 and payload 32 to form the cache line request to be sent to memory device 110. In some implementations, the ingress pipeline and/or egress pipeline of programmable switch 104 may perform additional operations, such as error checking using a CRC portion of payload 32, adding a timestamp to the cache line request, or identifying additional cache lines to request as part of a prefetch process.

In addition, programmable switch 104 may wait to receive a confirmation or return message from memory device 110 indicating that the cache line request has been received by memory device 110. After a timeout period, programmable switch 104 may resend the cache line request, which can improve fault tolerance for dropped packets.

As discussed below with reference to FIGS. 8 and 9, programmable switch 104 may perform additional operations in processing a cache line request, such as sending indications of one or more updates performed on cache directory 12 to another programmable switch (e.g., a backup programmable switch) and/or SDN controller 102. As another example, programmable switch 104 may also send a cache line request to another client that may have modified the requested data so the modified data can be returned to its home memory device 110 more quickly than waiting for memory device 110 to request the modified data.

Figure 8:
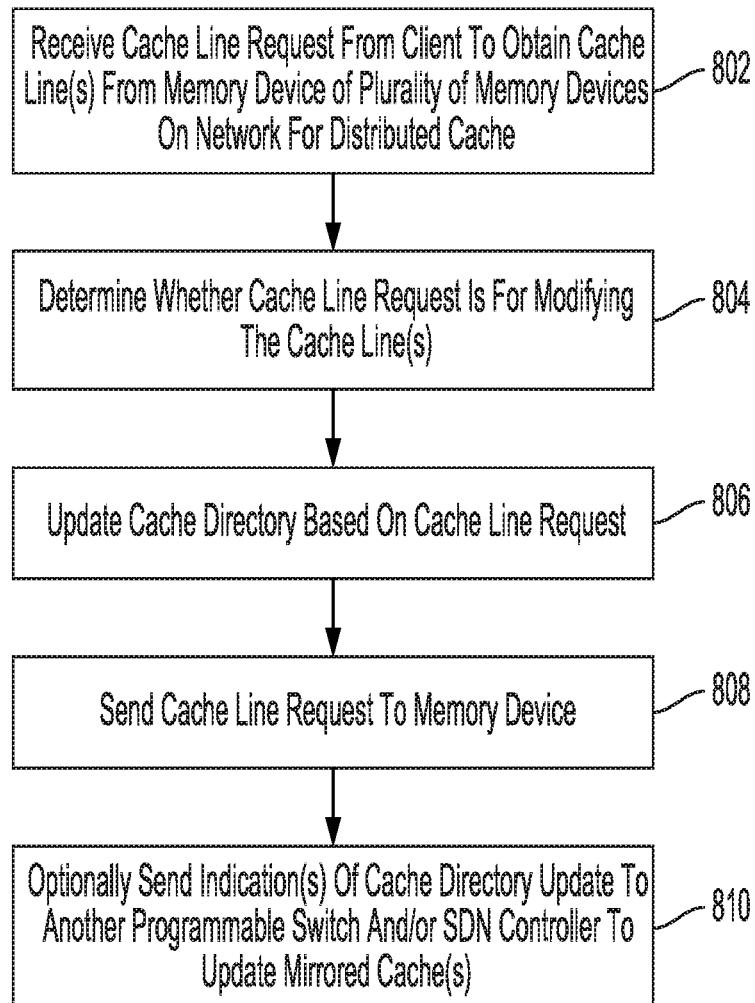
FIG. 8 is a flowchart for a cache line request and modification determination process according to one or more embodiments.

FIG. 8 is a flowchart for a cache line request and modification determination process that can be performed by circuitry 132 of a programmable switch 104 executing switch cache module 26 according to one or more embodiments. In block 802, programmable switch 104 receives a cache line request from a client 114 to obtain one or more cache lines from memory device of a plurality of memory devices 110 on a network for a distributed cache.

In block 804, programmable switch 104 determines whether the cache line request is for modifying the one or more cache lines. In some implementations, an ingress stage of programmable switch 104 may compare an OpCode field in the header to a particular OpCode indicating a request to modify the requested data. The determination of whether the cache line request is to modify the data may affect how programmable switch 104 updates cache directory 12 and/or if programmable switch 104 should perform other operations to manage conflicting requests to modify the same data.

In block 806, programmable switch 104 updates its local cache directory 12 based on the cache line request received in block 802. In some implementations, one or more egress stages may perform the update. For example, an egress stage of egress pipeline 40 (e.g., stage $40_1$ or $40_2$ in FIG. 3A) may change a status for the cache line or cache lines in cache directory 12 to modified or in progress of being modified if it is determined that the cache line request is for modifying the requested data. In another example, the status in cache directory 12 may be updated to shared to indicate a read-only access for the requested data. As other examples, a version number for the requested data may be incremented in response to a request to modify the data, or a client 114 may be added or removed from the other nodes list of devices storing a copy of the data. As noted above, the updating of cache directory 12 may occur before or after the cache line request is sent to memory device 110. In some implementations, programmable switch 104 may update cache directory 12 after receiving the requested data from memory device 110.

In block 808, programmable switch 104 sends the reassembled cache line request to the memory device 110 serving as a home node that stores the requested data. A traffic manager of programmable switch 104 may identify a port for the memory device 110 and a deparser of programmable switch 104 may reassemble a previously extracted header and payload to form the cache line request to be sent to memory device 110. In some implementations, the ingress pipeline and/or egress pipeline of programmable switch 104 may perform additional operations, such as error checking, timestamping the cache line request, and/or identifying additional cache lines to request as part of a prefetch process.

In addition, programmable switch 104 may wait to receive a confirmation or return message from memory device 110 indicating that the cache line request has been received by memory device 110. After a timeout period, programmable switch 104 may resend the cache line request, which can improve fault tolerance for dropped packets.

In block 810, programmable switch 104 optionally sends one or more indications of updates to its local cache directory 12 to another programmable switch 104 and/or SDN controller 102 to update mirrored cache directories. Such updates can include, for example, a new version number, other nodes that may store a copy of the data, and/or timestamps for when the data was modified or authorized to be modified.

As discussed above, the mirroring of cache directory 12 at another programmable switch 104 and/or SDN controller 102 can improve the fault tolerance or redundancy of the distributed cache. If the cache directory becomes unavailable at programmable switch 104, such as due to a power loss or removal of programmable switch 104 from its server rack 101, the other programmable switch for the rack or SDN controller 102 can be used. As with the sending of a cache line request to a memory device 110, a packet retransmission may also be used when sending indications of updates to cache directory 12 to other programmable switches and/or SDN controller 102.

Figure 9:
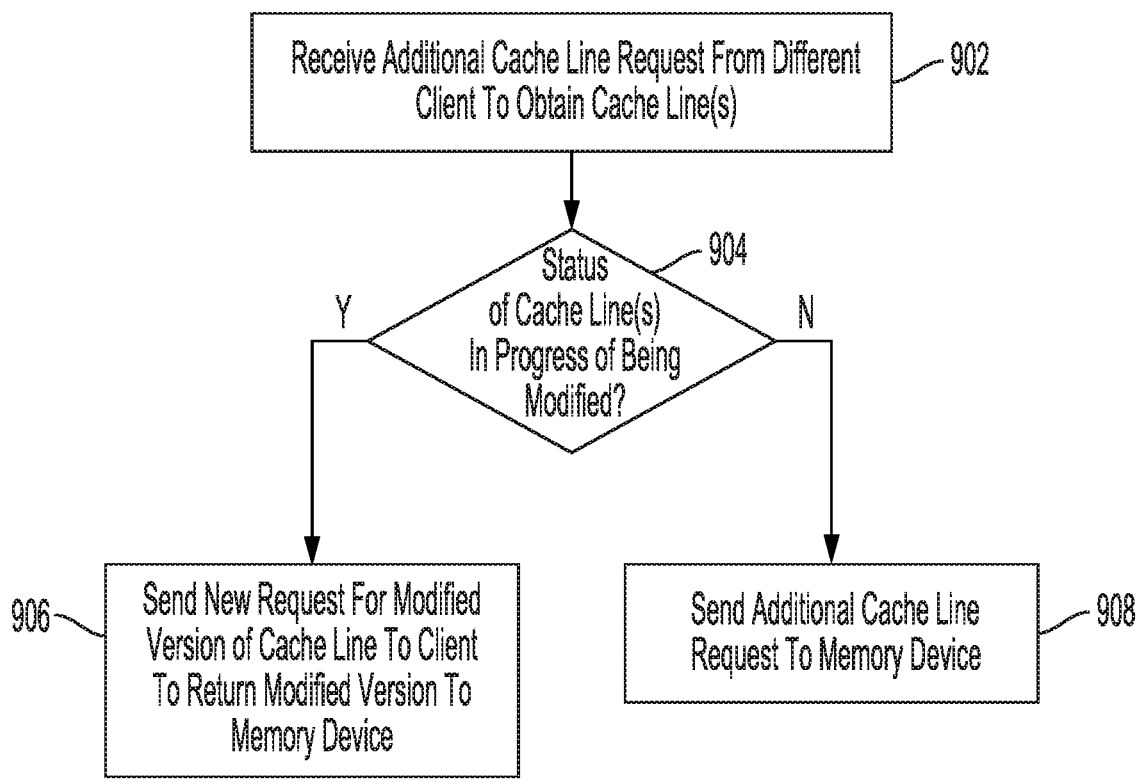
FIG. 9 is a flowchart for a cache line request conflict process according to one or more embodiments.

FIG. 9 is a flowchart for a cache line request conflict process that can be performed by circuitry 132 of a programmable switch 104 executing switch cache module 26 according to one or more embodiments. The process of FIG. 9 may occur after the receipt of a first cache line request, as in the processes of FIG. 7 or 8.

In block 902, programmable switch 104 receives an additional cache line request from a client 114 that is different from another client 114 that sent a previous cache line request to obtain one or more cache lines. In block 904, programmable switch 104 checks the status of the one or more cache lines being requested by the additional cache line request to determine if the requested cache line or lines are in progress of being modified. An ingress or egress pipeline may check cache directory 12 to determine if a status in the cache directory 12 for one or more entries corresponding to the cache line or lines indicate that the data is being modified.

If it is determined that the cache line or lines are in the process of being modified, programmable switch 104 in block 906 sends a new cache line request for the modified version of the cache line or lines to the previous client 114 to return the modified cache line or lines to memory device 110. In such cases, time and the use of processing resources of memory device 110 can be conserved by not having memory device 110 prepare and send the new request for the modified data back to programmable switch 104.

If it is instead determined in block 904 that the cache line or lines are not in the process of being modified, programmable switch 104 in block 908 sends the additional cache line request to memory device 110 to obtain the requested data. As discussed above with reference to the example state diagrams of FIG. 5A, the previous cache line request by the first client 114 may be a read-only or shared request for the data. In such cases, the additional cache line request may proceed to memory device 110 without sending a new cache line request to the first client 114 to obtain a modified version of the requested data.

As will be appreciated by those of ordinary skill in the art, other embodiments of programmable switch 104 may not send a new cache line request for the modified data as in the cache line request conflict process of FIG. 9. For example, the processes of FIGS. 7 and/or 8 may proceed by forwarding additional cache line requests for data being modified to the home memory device 110, without sending a new cache line request to the client modifying the data. In this regard, the home memory device 110 acts as a serialization point that controls the order of operations on the requested data. As shown in the example state diagram of FIG. 5B discussed above, the home memory device 110 can probe the client modifying the data to return the modified data to the home memory device 110 before sending the modified data to the client requesting the data via the programmable switch.

Figure 10:
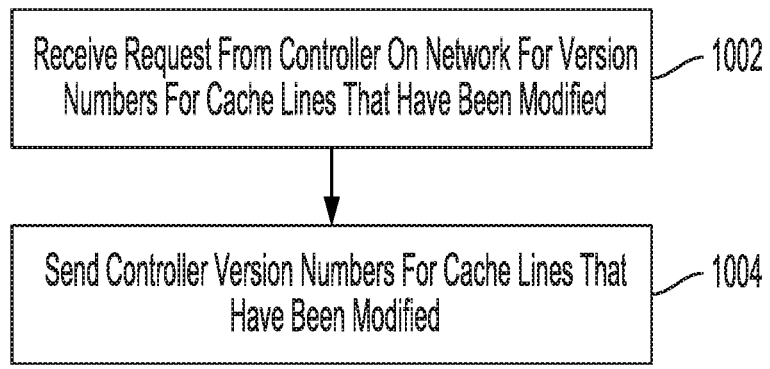
FIG. 10 is a flowchart for a cache directory coherency process according to one or more embodiments.

FIG. 10 is a flowchart for a cache directory coherency process that can be performed by circuitry 132 of a programmable switch 104 executing switch cache module 26 according to one or more embodiments. In block 1002, programmable switch 104 receives a request from SDN controller 102 for version numbers for cache lines that have been modified. In some cases, SDN controller 102 may periodically send requests to programmable switches 104 in system 100, such as every hour or based on an amount of network traffic. The sending of such requests and maintenance of a global cache directory 20 at SDN controller 102 may be performed by processor 124 executing cache controller module 22, as in the example of FIG. 2. In some implementations, additional information may also be sent to SDN controller 102, such as timestamps, statuses, or indications of other nodes storing copies of particular cache lines.

In block 1004, programmable switch 104 sends version numbers for cache lines that have been modified since a last request received from SDN controller 102 for version numbers. Programmable switch 104 can use information in its local cache directory 12, such as version numbers and/or timestamps to identify changes to data since a previous request from SDN controller 102. As with other messages sent by programmable switch 104, a timeout period for receiving a confirmation from SDN controller 102 can be used to ensure that the updates are received by SDN controller 102.

As discussed above, the foregoing use of a centralized programmable switch to maintain a local cache directory can allow for a distributed cache with coherent cache lines throughout the distributed cache. In addition, limiting the local cache directory of the programmable switch to the memory devices in communication with the programmable switch, such as to memory devices in the same server rack, can allow for scalability of the distributed cache. The use of a home memory device to act as a serialization point and a time synchronization point for the cache lines stored in the memory device further promote scalability of the distributed cache. The foregoing arrangements of mirrored cache directories and packet retransmission also improve the fault tolerance of the distributed cache.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A programmable switch, comprising:
   a plurality of ports for communication with devices on a network; and
   circuitry configured to:
     receive a cache line request from a client on the network to obtain a cache line for performing an operation by the client;
     identify a port of the plurality of ports for communicating with a memory device storing the cache line, wherein the memory device is one of a plurality of memory devices used for a distributed cache;
     update a cache directory stored at the programmable switch for the distributed cache based on the cache line request; and
     send the cache line request to the memory device using the identified port.

2. The programmable switch of claim 1, wherein the circuitry is further configured to:
   receive an additional cache line request from a different client to obtain the cache line;
   determine a status of the cache line as being in progress of being modified by the client based on the updated cache directory; and
   send a new request for a modified version of the cache line to the client to return the modified version of the cache line to the memory device.

3. The programmable switch of claim 1, wherein the circuitry is further configured to:
   determine whether the cache line request is for modifying the cache line; and
   in response to determining that the cache line request is for modifying the cache line, update a version number for the cache line in the cache directory.

4. The programmable switch of claim 1, wherein the cache line request follows a custom packet format including one or more fields indicating a permission level for the operation to be performed by the client.

5. The programmable switch of claim 1, wherein the cache line request follows a custom packet format including one or more fields indicating that the cache line request is a cache line memory message.

6. The programmable switch of claim 1, wherein the programmable switch forms part of a Software Defined Networking (SDN).

7. The programmable switch of claim 1, wherein the cache directory is configured to include network addresses for multiple devices on the network that store data corresponding to a memory address for the cache line.

8. The programmable switch of claim 1, wherein the circuitry is further configured to send an indication of the cache directory update to at least one of another programmable switch on the network and a Software Defined Networking (SDN) controller to update one or more mirrored cache directories.

9. The programmable switch of claim 1, wherein the circuitry is further configured to:

receive a request from a controller on the network for version numbers for cache lines that have been modified; and send the controller version numbers for the cache lines that have been modified.

10. A method of providing a distributed cache, the method comprising:

receiving a cache line request from a client on a network to obtain a cache line from a memory device of a plurality of memory devices used for a distributed cache;

determining whether the cache line request is for modifying the cache line;

in response to determining that the cache line request is for modifying the cache line, updating a version number for the cache line in a cache directory for the distributed cache; and sending the cache line request to the memory device.

11. The method of claim 10, further comprising:

receiving an additional cache line request from a different client to obtain the cache line;

determining a status of the cache line as being in progress of being modified by the client based on the updated cache directory; and sending a new request for a modified version of the cache line to the client to return the modified version of the cache line to the memory device.

12. The method of claim 10, wherein the cache line request follows a custom packet format including one or more fields indicating a permission level for determining whether the cache line is to be modified or read by the client.

13. The method of claim 10, wherein the cache line request follows a custom packet format including one or more fields indicating that the cache line request is a cache line memory message.

14. The method of claim 10, wherein the cache directory is updated by a programmable switch that forms part of a Software Defined Networking (SDN).

15. The method of claim 10, wherein the cache directory is configured to include network addresses for multiple devices on the network that store data corresponding to a memory address for the cache line.

16. The method of claim 10, further comprising sending an indication of the cache directory update to at least one of a programmable switch on the network and a Software Defined Networking (SDN) controller to update one or more mirrored cache directories.

17. The method of claim 10, further comprising:

receiving a request from a controller on the network for version numbers for cache lines that have been modified; and sending version numbers to the controller for the cache lines that have been modified.

18. The method of claim 10, wherein a status of the cache line in the cache directory indicates that multiple clients on the network have a shared read-only permission level.

19. A non-transitory computer readable medium storing computer-executable instructions, wherein when the computer-executable instructions are executed by circuitry of a programmable switch, the computer-executable instructions cause the circuitry to:

receive a cache line request from a client to obtain a cache line for performing an operation by the client;

identify a port from among a plurality of ports of the programmable switch for communicating with a memory device storing the cache line, wherein the memory device is one of a plurality of memory devices used for a distributed cache;

update a cache directory for the distributed cache based on the cache line request;

send an indication of the cache directory update to at least one of another programmable switch on the network and a Software Defined Networking (SDN) controller to update one or more mirrored cache directories; and send the cache line request to the memory device using the identified port.

20. A system for a distributed cache, the system comprising:

a plurality of memory devices storing at least part of the distributed cache;

a first programmable switch in communication with one or more of the plurality of memory devices, the first programmable switch including first circuitry; and a second programmable switch in communication with the first programmable switch and with one or more of the plurality of memory devices, the second programmable switch including second circuitry; and wherein the first circuitry and the second circuitry are configured to update respective cache directories for the distributed cache based on cache line requests received by at least one of the first programmable switch and the second programmable switch.

21. The system of claim 20, wherein the first circuitry is further configured to send to the second programmable switch an indication of an update to the cache directory of the first programmable switch.

22. The system of claim 21, wherein the second circuitry is further configured to update the cache directory of the second programmable switch in response to receiving the indication of the update to the cache directory of the first programmable switch.

23. The system of claim 20, wherein the first circuitry is further configured to send an indication of an update to the cache directory of the first programmable switch to a Software Defined Networking (SDN) controller.

24. The system of claim 20, wherein the first circuitry is further configured to:

receive a request from a controller in communication with the first programmable switch for version numbers for cache lines that have been modified; and send the controller version numbers for the cache lines that have been modified.

25. The system of claim 20, wherein the first circuitry is further configured to:

receive a cache line request from a client to obtain a cache line for performing an operation by the client;

identify a port from among a plurality of ports of the first programmable switch for communicating with a memory device of the plurality of memory devices that stores the cache line;

update the cache directory of the first programmable switch based on the cache line request; and send the cache line request to the memory device using the identified port.

26. The system of claim 25, wherein the first circuitry is further configured to:

receive an additional cache line request from a different client to obtain the cache line;

determine a status of the cache line as being in progress of being modified by the client based on the updated cache directory; and send a new request for a modified version of the cache line to the client to return the modified version of the cache line to the memory device.

27. The system of claim 25, wherein the first circuitry is further configured to:
   determine whether the cache line request is for modifying the cache line; and
   in response to determining that the cache line request is for modifying the cache line, update a version number for the cache line in the cache directory of the first programmable switch.

28. The system of claim 25, wherein the cache line request follows a custom packet format including one or more fields indicating a permission level for determining whether the cache line is to be modified or read by the client.

29. The system of claim 25, wherein the cache line request follows a custom packet format including one or more fields indicating that the cache line request is a cache line memory message.

30. The system of claim 20, wherein each cache directory of the first programmable switch and the second programmable switch is configured to include network addresses for multiple devices that store data corresponding to a memory address for a cache line.

31. A programmable switch, comprising:
a plurality of ports for communication with devices on a network; and
means for:
   receiving a cache line request from a client on the network to obtain a cache line for performing an operation by the client;
   identifying a port of the plurality of ports for communicating with a memory device storing the cache line, wherein the memory device is one of a plurality of memory devices used for a distributed cache;
   updating a cache directory for the distributed cache based on the cache line request;
   sending the cache line request to the memory device using the identified port;
   receiving an additional cache line request from a different client to obtain the cache line;
   determining a status of the cache line as being in progress of being modified by the client based on the updated cache directory; and
   sending a new request for a modified version of the cache line to the client to return the modified version of the cache line to the memory device.

* * * * *